US007232376B2

(12) United States Patent
Droppleman

(10) Patent No.: US 7,232,376 B2
(45) Date of Patent: Jun. 19, 2007

(54) SEPARABLE GOLF CLUB

(75) Inventor: J. Patrick Droppleman, Libertyville, IL (US)

(73) Assignee: Parker Davis LLC, Chicago, IL (US)

(*) Notice: Subject to any disclaimer, the term of this patent is extended or adjusted under 35 U.S.C. 154(b) by 0 days.

(21) Appl. No.: 10/844,127

(22) Filed: May 12, 2004

(65) Prior Publication Data
US 2005/0079923 A1 Apr. 14, 2005

Related U.S. Application Data

(63) Continuation-in-part of application No. 10/685,255, filed on Oct. 14, 2003, now abandoned.

(51) Int. Cl.
*A63B 53/16* (2006.01)
(52) U.S. Cl. ..................... 473/288; 473/296
(58) Field of Classification Search ............... 473/288, 473/296–299, 305–307; 409/348–349, 361, 409/293; 403/348–349
See application file for complete search history.

(56) References Cited

U.S. PATENT DOCUMENTS

| 25,117 | A | | 8/1859 | Heneage |
| 692,795 | A | | 2/1902 | Moyle |
| 782,955 | A | * | 2/1905 | Emens .................. 473/307 |
| 1,130,726 | A | | 3/1915 | Greve |
| 1,253,065 | A | | 1/1918 | Looze |
| 1,542,703 | A | | 6/1925 | Kirkham |
| 1,601,056 | A | | 9/1926 | Agner |

(Continued)

FOREIGN PATENT DOCUMENTS

| FR | 2 473 656 | 7/1981 |
| GB | 1 150 136 | 4/1969 |

OTHER PUBLICATIONS

International Search Report issued in PCT/US2004/034452 mailed on Feb. 11, 2005, 8 pages.

(Continued)

*Primary Examiner*—Stephen Blau
(74) *Attorney, Agent, or Firm*—Marshall, Gerstein & Borun LLP

(57) ABSTRACT

A separable golf club includes an upper shaft portion with a grip and a lower shaft portion with a club head, wherein the upper and lower shaft portions can be quickly connected and disconnected, while allowing a large amount of force to be transferred there through. The upper and lower shaft portions may be connected by a first and second connector portions, that may be engaged and rotated relative to each other. The first connector portion may include a first locking member having a plurality of outwardly protruding lugs and a guide rod, while the second connector portion may include a second locking member having a cavity and a bore. The bore is adapted to receive the guide rod, and the cavity is adapted to receive the outwardly protruding lugs. During connection, the user engages the first locking member with the second locking member, inserts the lugs into the cavity, and rotates the first and second connector portions relative to each other thereby causing the lugs to fixedly engage the cavity, which causes the upper and lower shaft portions of the golf club to be connected together.

17 Claims, 11 Drawing Sheets

U.S. PATENT DOCUMENTS

| | | | |
|---|---|---|---|
| 1,623,523 A | 4/1927 | Bourke | |
| 1,634,887 A | 7/1927 | Rigby | |
| 1,762,572 A * | 6/1930 | Davidson | 403/343 |
| 1,946,134 A * | 2/1934 | Dyce | 473/307 |
| 1,978,643 A | 10/1934 | McKettrick | |
| 2,067,556 A | 1/1937 | Wettlaufer | |
| 2,111,859 A | 3/1938 | Kennedy | |
| 2,379,984 A | 7/1945 | Nereaux | |
| 3,516,697 A | 6/1970 | Hahn | |
| 3,876,234 A | 4/1975 | Harms | |
| 4,128,242 A * | 12/1978 | Elkins, Jr. | 473/291 |
| 4,340,227 A * | 7/1982 | Dopkowski | 473/288 |
| 4,437,663 A * | 3/1984 | Crisci | 473/306 |
| 4,664,382 A | 5/1987 | Palmer et al. | |
| 4,848,747 A | 7/1989 | Fujimura et al. | |
| 4,852,782 A | 8/1989 | Wu et al. | |
| 4,858,966 A | 8/1989 | Ciriscioli et al. | |
| 4,927,152 A | 5/1990 | Graham | |
| 4,943,059 A | 7/1990 | Morell | |
| 4,986,690 A | 1/1991 | Cooksey | |
| 5,167,465 A | 12/1992 | Inui et al. | |
| 5,190,224 A | 3/1993 | Hamilton | |
| 5,282,619 A | 2/1994 | Napolitano et al. | |
| 5,326,036 A | 7/1994 | Wilger | |
| 5,350,177 A | 9/1994 | Furbush, Jr. | |
| 5,403,043 A | 4/1995 | Smet | |
| 5,522,606 A | 6/1996 | Pressley et al. | |
| 5,545,152 A | 8/1996 | Funderburk et al. | |
| 5,716,289 A * | 2/1998 | Okoneski | 473/297 |
| 5,727,739 A | 3/1998 | Hamilton | |
| 5,741,084 A | 4/1998 | Del Rio et al. | |
| 5,765,691 A | 6/1998 | Hall | |
| 5,792,006 A | 8/1998 | Hesser | |
| 5,810,064 A | 9/1998 | Sanderson et al. | |
| 5,927,361 A | 7/1999 | Sanderson et al. | |
| 6,015,354 A * | 1/2000 | Ahn et al. | 473/256 |
| 6,039,659 A | 3/2000 | Hamm | |
| 6,196,256 B1 | 3/2001 | Klampfer | |
| 6,203,446 B1 * | 3/2001 | Collins | 473/313 |
| 6,217,042 B1 | 4/2001 | Kurtz et al. | |
| 6,254,303 B1 | 7/2001 | Falat et al. | |
| 6,267,418 B1 | 7/2001 | Hogue et al. | |
| 6,296,576 B1 | 10/2001 | Capelli | |
| 6,402,632 B2 | 6/2002 | Hope et al. | |
| 6,447,404 B1 | 9/2002 | Wilbur | |
| 6,616,197 B2 | 9/2003 | Sampson | |
| 6,890,269 B2 * | 5/2005 | Burrows | 473/307 |
| 6,896,626 B2 * | 5/2005 | Drossos | 473/294 |
| 2003/0004009 A1 * | 1/2003 | Hoffman et al. | 473/312 |
| 2003/0050131 A1 * | 3/2003 | Grace | 473/296 |

OTHER PUBLICATIONS

Written Opinion issued in PCT/US2004/034452 mailed on Feb. 11, 2005, 5 pages.

International Search Report issued in PCT/US2005/016479 mailed on Feb. 6, 2006, 10 pages.

Written Opinion issued in PCT/US2005/016479 mailed on Feb. 6, 2006, 11 pages.

\* cited by examiner

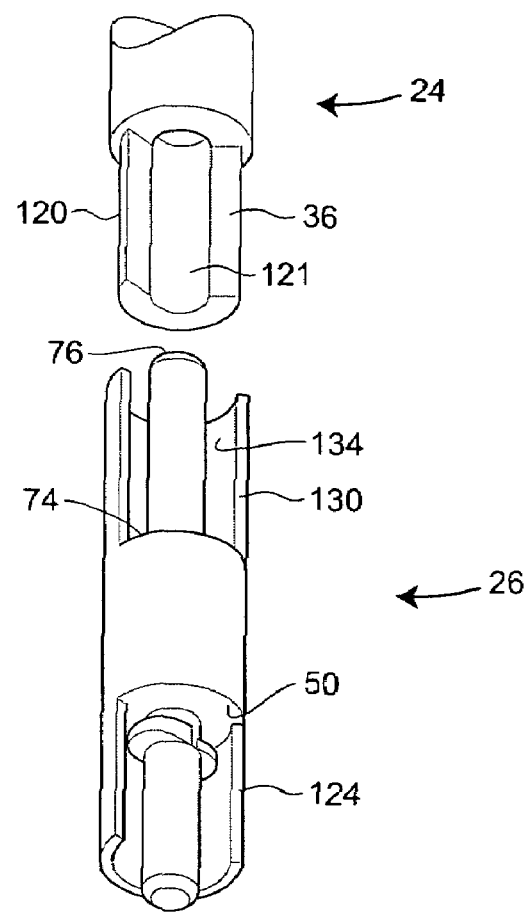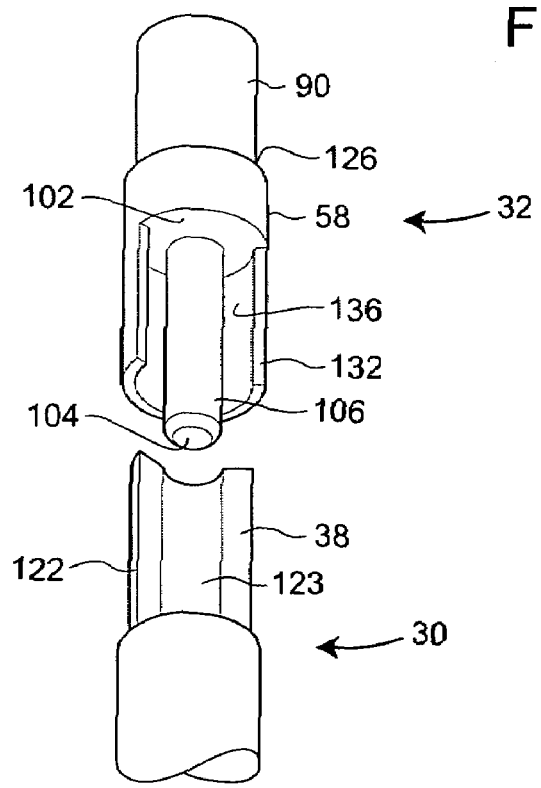
FIG. 8

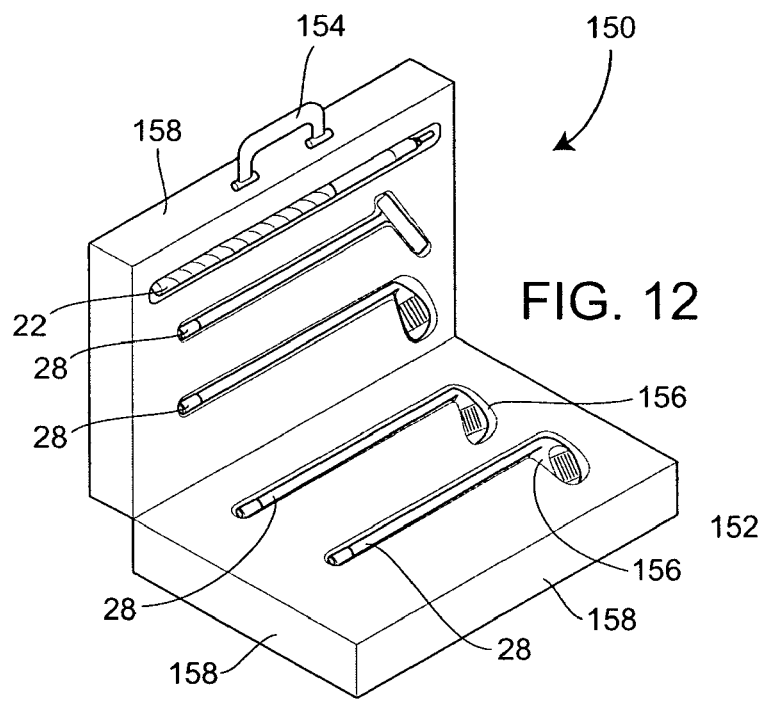
FIG. 12
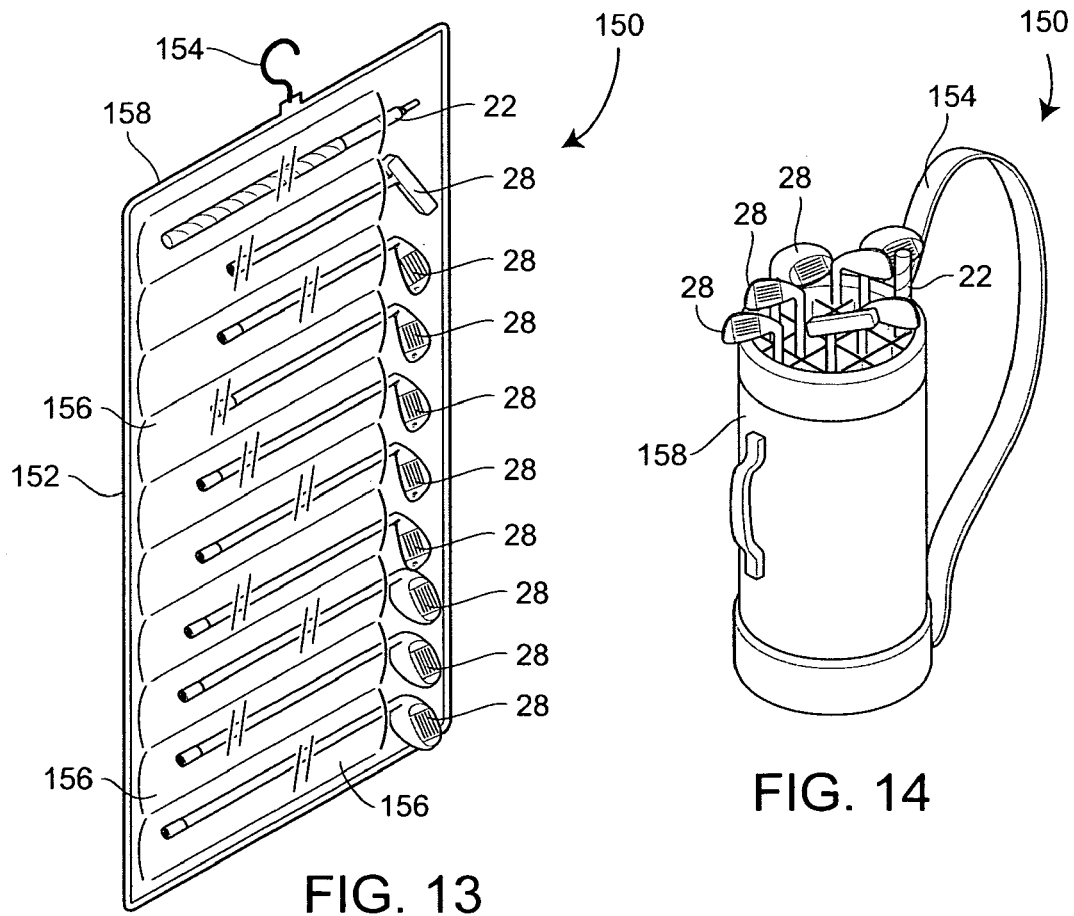
FIG. 13
FIG. 14

SEPARABLE GOLF CLUB

RELATED APPLICATION DATA

The present application is a continuation-in-part application based on, and claiming the priority benefit of, U.S. application Ser. No. 10/685,255, which was filed on Oct. 14, 2003, now abandoned and is expressly incorporated by reference herein.

TECHNICAL FIELD

The present invention relates generally to a separable golf club and, more particularly, to a quickly and easily separable golf club having variable weighting features.

BACKGROUND

Collapsible and separable golf clubs are known in the art, and are typically connected using a screw-type connection, or other type of connections that are either hard to manipulate or cannot be manipulated quickly. For example, U.S. Pat. No. 5,282,619 discloses a collapsible golf club having an upper shaft portion, with a grip, an intermediate shaft portion, and a lower shaft portion with a club head all of which are connected to one another via an elaborate screw-type mechanism. The upper shaft portion includes a first securing mechanism at one end having an externally threaded surface at the head locking nut adapted to threadably engage with the externally threaded portion, and an aperture adapted to receive the intermediate portion of the shaft. A first end of the intermediate portion of the shaft is sized and shaped to slidingly engage with the aperture of the first securing mechanism. A second end of the intermediate portion of the shaft includes a second securing mechanism which is substantially similar to the first securing mechanism. In a similar manner, a first end of the lower shaft portion is sized and shaped to slidingly engage with the second securing mechanism. In a collapsed state, the intermediate portion is recessed into the upper portion of the shaft, and the lower portion of the shaft is recessed within the intermediate portion of the shaft, thereby creating a golf club that is slightly larger than the upper portion of the shaft. To achieve an extended state, the intermediate portion must be pulled from the upper portion of the shaft and the lower portion of the shaft must be pulled from the intermediate portion of the shaft. The shaft portions are then secured relative to each other by threadably engaging the locking nuts with the externally threaded portions on each of the upper and intermediate portions of the shaft, thereby causing the locking nuts to tighten around the shaft portions disposed within the externally threaded areas.

Similarly, U.S. Pat. No. 5,792,006 discloses an axially collapsible golf club having a first portion and a second portion on a grip at a first end and which are moveable with respect to one another. The first portion includes a pair of holes and a receiving aperture at a second end. The second portion has a pair of internally threaded holes at a first end and a club head at a second end. The first end of the second portion of the shaft is received internally of the second end of the first portion of the shaft, such that the second portion of the shaft can retract into the first portion of the shaft. In an extended state, the pair of holes on the first portion and the pair of internally threaded holes on the second portion are aligned so that a pair of fasteners may be inserted through the first portion of the shaft into the threaded holes of the second portion of the shaft, thereby rigidly connecting the first and second portions. To collapse the golf club, the fasteners are removed from the internally threaded holes of the second portion of the shaft and from the holes of the first portion of the shaft, thereby allowing the first portion to retract into the second portion of the shaft.

U.S. Pat. No. 6,447,404 discloses a separable-shaft golf club having a separable shaft with first and second portions connected by a threadable fastener. More specifically, a male threaded fastener is inserted into the first portion of the shaft and a female threaded fastener is inserted into the second portion of the shaft, thereby allowing the first portion to threadably engage the second portion of the shaft. To extend the shaft, the male fastener is threaded into the female fastener thereby creating one contiguous shaft. On the other hand, to collapse the shaft, the male fastener is simply unscrewed from the female fastener thereby creating two separate shaft portions.

These collapsible and separable golf clubs all require an extended period of time to be connected and/or disconnected, thereby making the use of these clubs during fitting, practice and actual golf play difficult and impractical. Similarly, the twisting and bending forces placed on these golf clubs during normal playing conditions may weaken the connections, causing improper ball flight and potentially causing failure of the club and/or the connection.

SUMMARY OF THE DISCLOSURE

A separable golf club includes an upper portion having a grip and a lower portion having a club head that can be quickly connected and disconnected, while allowing a large amount of force to be transferred between or through the upper and lower portions of the golf club. In one embodiment, the upper and lower portions of the shaft are connected by a first connector portion having a first locking member with a plurality of outwardly protruding lugs, and a second connector portion having a second locking member with a cavity. During connection, the user engages the first locking member with the second locking member, inserts the lugs into the cavity, and rotates the first and second connector portions relative to each other by, for example, a quarter of a turn, causing the lugs to engage the cavity, which, in turn, securely connects the upper and lower portions of the golf club together.

BRIEF DESCRIPTION OF THE DRAWINGS

FIG. 7 is top view of the separable golf club of FIG. 1, depicting in hidden lines the orientation of lugs of the connector portions relative to each other;

FIG. 8 is an isometric view of another embodiment of the connector portions of the separable golf club of FIG. 1 in the disconnected position;

FIG. 12 is an isometric view of one embodiment of a container for holding a set of separable golf clubs;

FIG. 13 is an isometric view of another embodiment of a container for holding a set of separable golf clubs; and FIG. 14 is an isometric view of another embodiment of a container for holding a set of separable golf clubs.

Figure 1:
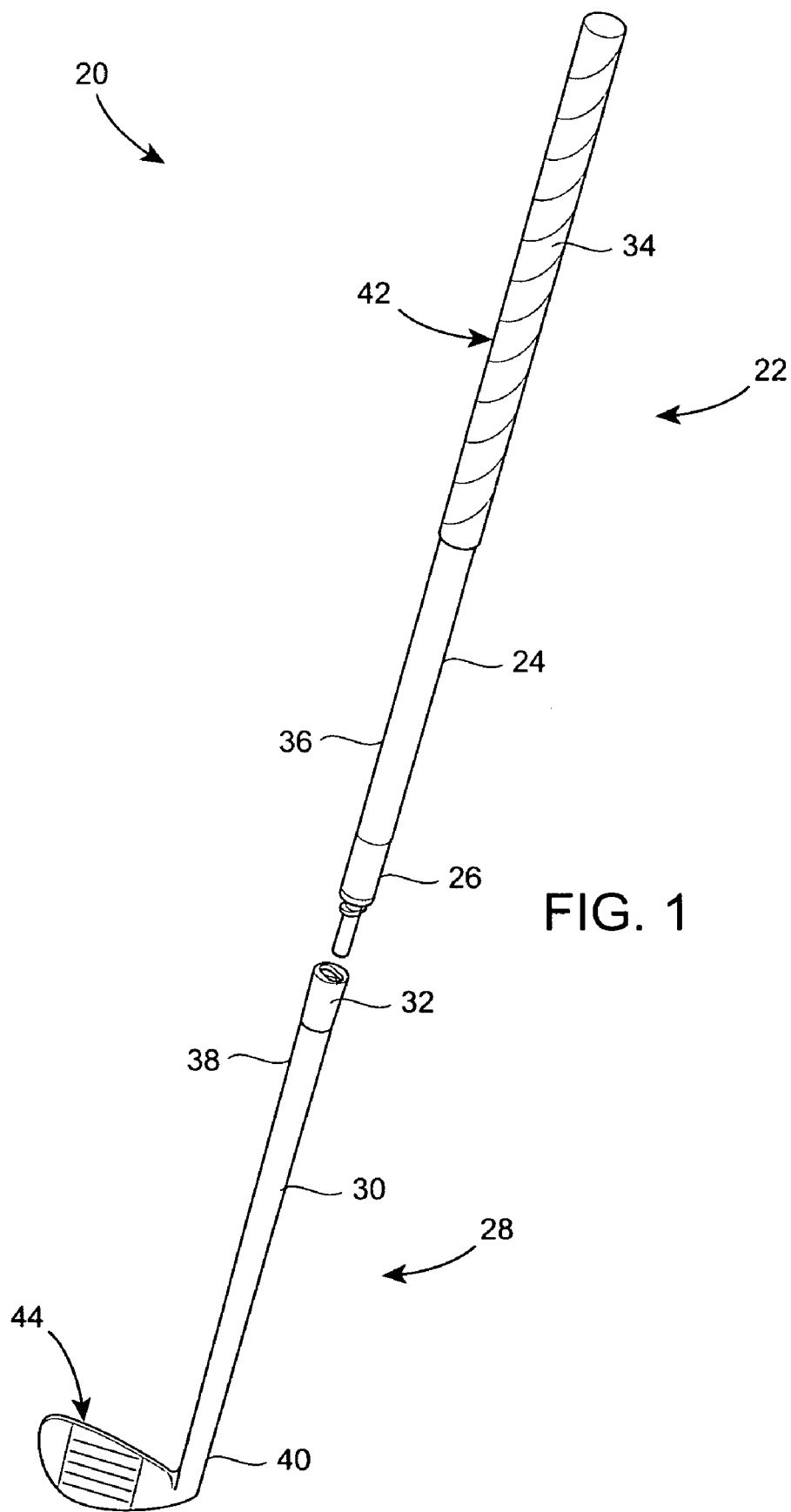
FIG. 1 is an isometric view of one embodiment of a separable golf club in a disconnected position.

While the method and device described herein are susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION

Referring to FIG. 1, a separable golf club 20 includes an upper portion 22 having an upper shaft section 24 and a first or male connector portion 26, in addition to a lower portion 28 having a lower shaft section 30 and a second or female connector portion 32. The separable golf club 20, as the name suggests, is used for hitting golf balls during fitting of golf equipment, during practice, and/or during play of the game of golf. The golf club 20, however, has the added feature of being separable, making the storage of and travel with the golf club 20 more convenient and space-saving. The golf club 20 also allows the weight lug of the club to be easily altered at various locations. The golf club 20 is, however, not limited to the uses identified above, but may adapted for any number of other uses.

As illustrated in FIG. 1, the upper shaft section 24 of the golf club 20 has a first end 34 and a second end 36, while the lower shaft section 28 has a first end 38 and a second end 40. A grip 42 is disposed at the first end 34 of the upper shaft section 24 and is adapted to provide a user with an area for securely holding the golf club 20 in the embodiment illustrated in FIG. 1, the male connector portion 26 is disposed on the second end 36 of the of the upper shaft section 24 of the golf club 20, and is adapted to engage the female connector portion 32 disposed on the first end 38 of the lower shaft section 30 of the golf club 20. A club head 44 is disposed on the second end 40 of the lower shaft section 30 of the golf club 20, and is adapted to, as the name suggests, contact golf balls during fitting, practice and/or play of the game of golf.

Figure 2:
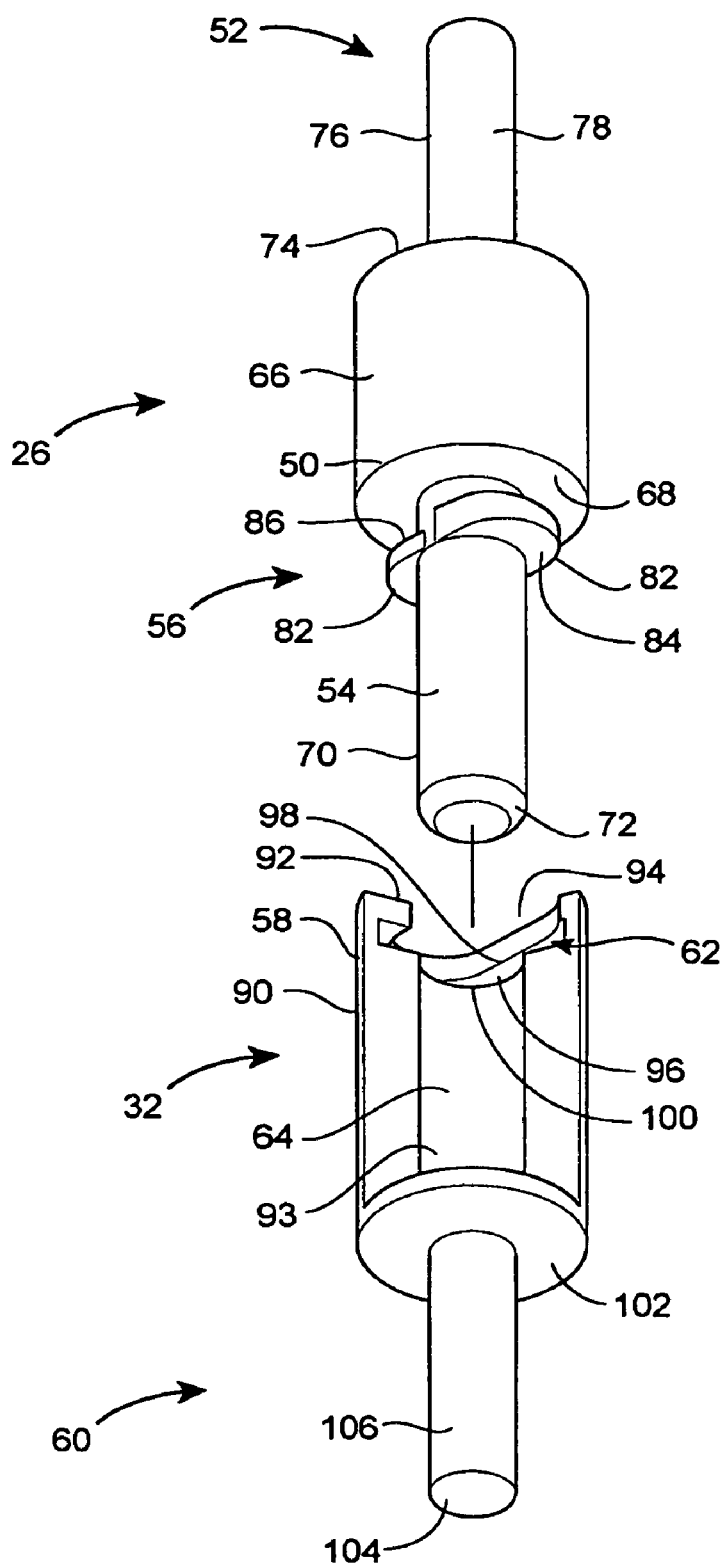
FIG. 2 is an isometric view of one embodiment of the first and second connector portions of FIG. 1, in a disconnected position.

As shown in FIG. 2, the male connector portion 26 of the golf club 20 includes a first base 50, a first receiving portion 52, a guide rod 54, and a first locking member 56, while the female connector portion 32 includes a second base 58, a second receiving portion 60, a second locking member 62, and a bore 64.

More specifically, the first base 50 of the male connector portion 26 includes an exterior surface 66 having a generally round profile, and a substantially smooth finish. A mating surface 68, which is generally flat and smooth, defines the top of the first base 50. The guide rod 54 is of a generally cylindrical shape having an outer surface 70. An annular chamfer 72 may be located at an end of the guide rod 54, opposite the mating surface 68, to aid in the insertion of the guide rod 54 into the female connector portion 32.

Figure 3:
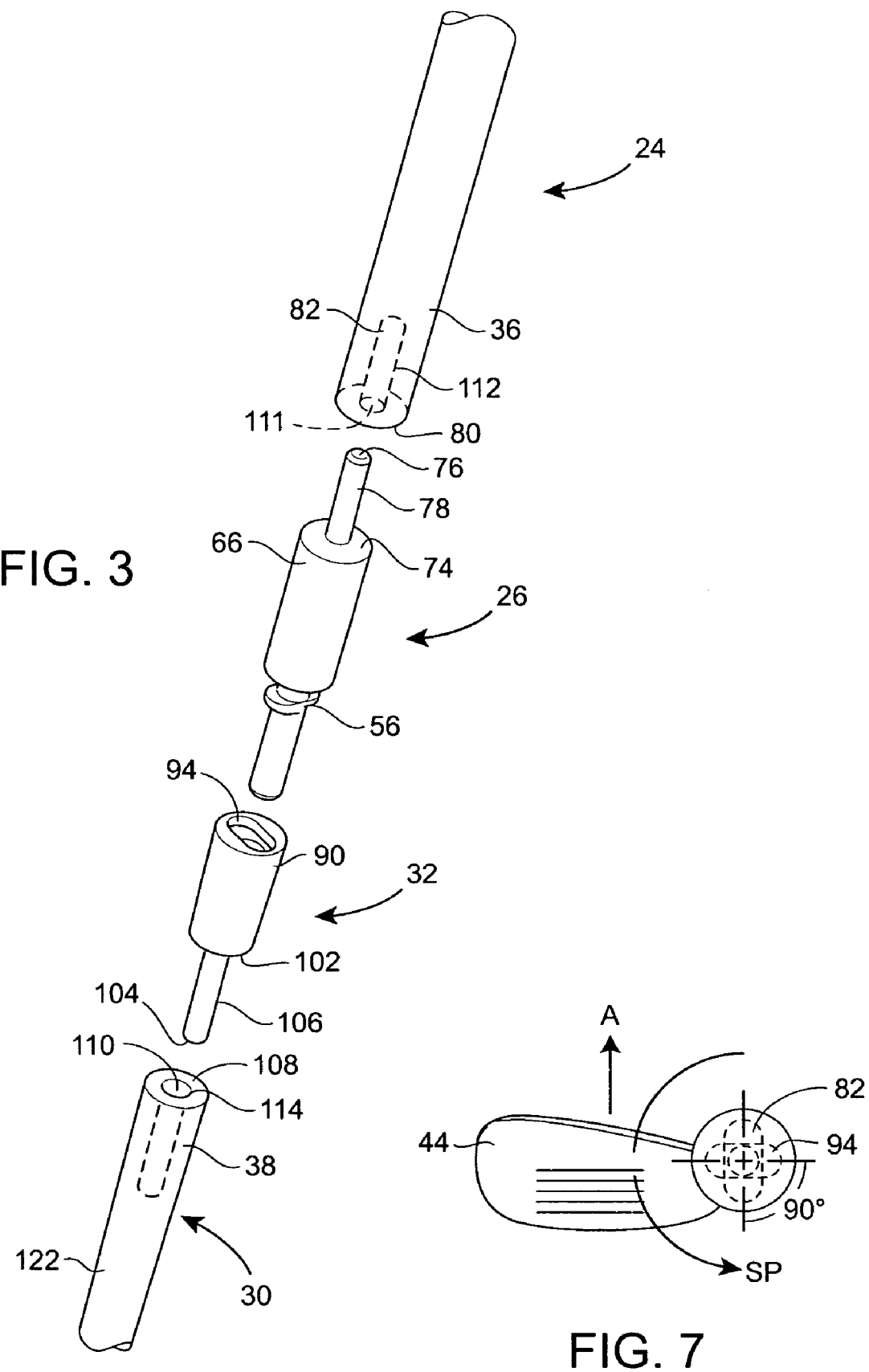
FIG. 3 is an exploded isometric view of the connector portions of the separable golf club of FIG. 1.

The receiving portion 52 is disposed opposite the guide rod 54 on the male connector portion 26 and includes a retaining flange 74 and a plug portion 76. The retaining flange 74 has a generally annulus shape that extends radially inwardly from the exterior surface 66 of the first base 50, such that an outer perimeter of the flange 74 meets the exterior surface 66 and an inner perimeter of the flange 74 meets an outer surface 78 of the plug portion 76. The retaining flange 74, as seen in FIG. 3, has a generally smooth surface and is substantially equal in size and shape to an annulus portion 80 located at the second end 36 of the upper shaft section 24. Returning to FIG. 2, the plug portion 76 is disposed from the retaining flange 74 and extends in an upwardly direction therefrom. The plug portion 76 has a generally circular cylindrical shape and has the outer surface 78 which, in this embodiment, has a generally smooth surface and is sized and shaped to engage an aperture 82 disposed on the second end 36 of the upper shaft section 24 (FIG. 3), using, for example, a press fit connection.

The first locking member 56, as seen in FIG. 2, may be disposed near the base 50 on the guide rod 54, and may include one or more lugs 82 protruding radially outwardly from the guide rod 54. The lugs 52 may be any type of protrusion extending radially from the first locking member 56, able to engage at least a portion of the female connector portion 32. The exemplary embodiment of FIG. 2, the lugs 52 include an upper surface 84 and a lower surface 86, which may be oriented such that the upper surface 84 and the lower surface 86 are not parallel to each other. More specifically, the lower surface 86 of the lugs 82 may be manufactured to create a slanted or semi-spiral surface to allow gradual tightening of the first and second connector portions 26, 32 during operation, and the upper surface 84 may remain parallel to the mating surface 68 of the first base 50. If desired the upper surface 84 may be slanted while the lower surface 86 is flat, or both the upper and lower surfaces 84, 86 may be slanted.

The first locking member 56 may form a locking shape created by the lugs 82, the guide rod 54, or a combination thereof. The locking shape formed by the lugs 82 may be oval, such that the guide rod 54 is located towards the center of the oval and the lugs 82 are located to either side of the guide rod 54.

Turning now to the female connector portion 32, the second base 58 of the female connector portion 32, as best illustrated in FIG. 2, includes an exterior surface 90, a second mating surface 92 and an aperture 94. As shown in FIG. 2, the profile of the exterior surface 90 of the second base 58 may be generally round, and the finish may be substantially smooth. The exterior surface 90 of the second base 58 may, however, include a great variety of profiles and finishes, and may be adapted to compliment the profile of the male connector portion 26, or of the first base 50 of the male connector portion 26. The second mating surface 92, which defines the bottom of the second base 58, may be generally flat and smooth.

The aperture 94 of the second base 58, which may be generally located towards the center of the second base 58 of the female connector portion 32, is adapted to allow passage of the first locking member 56 into the female connector portion 32. More specifically, the aperture 94 of the second base 58 has a complimentary shape to the locking shape of the first locking member 56 (best seen in FIG. 3), such that the first locking member 56 can pass through the aperture 94.

The bore 64, as depicted in FIG. 2, may be of a generally cylindrical shape, and is adapted to receive the guide rod 54 of the male connector portion 26. The second locking member 62, which may be located in the proximity of second base 58, includes a cavity 96 having lug surfaces 98 and 100. The cavity 96 is adapted to receive at least a portion of the first locking member 56, and the lug surfaces 98 and 100 are adapted to engage with the lower surface 86 and the upper surface 84 of the lugs 82. One or both of the lug surfaces 98, 100 may be parallel to the second mating surface 92 of the second base 58 of the female connector portion 32, or may be parallel to the lower surface 86 of the lugs 82. If desired one or both of the lug surfaces 98 and 100 may be slanted or semi-spiral with respect to the surface 92. In this case both of the lug surfaces 84 and 86 will generally be flat (i.e. parallel to one another) or slanted.

The receiving outer portion 60 is disposed opposite the aperture 94 of the second base 58 and includes a retaining flange 102 and a plug portion 104. The retaining flange 102 has a generally annulus shape that extends radially inwardly from the exterior surface 90 of the second base 58, such that an outer perimeter of the flange 102 meets the exterior surface 90 and an inner perimeter of the flange 102 meets an outer surface 106 of the plug portion 104. The retaining flange 102 has a generally smooth surface and is substantially equal in size and shape to an annulus portion 108 located at the first end 38 of the lower shaft section 30 (FIG. 3). Returning to FIG. 2, the plug portion 104 is disposed on the retaining flange 102 and extends in a downwardly direction therefrom. The plug portion 102 has a generally circular cylindrical shape and includes the outer surface 106 which, in this embodiment, has a generally smooth surface and is sized and shaped to engage an aperture 110 disposed on the first end 38 of the lower shaft section 30, as seen in FIG. 3, using, for example, a press fit connection.

The above exemplary embodiment may include many variations thereof to achieve and/or create additional or alternative features. For example, the exterior surface 66 of the first base 50 is not limited to smooth and round, but may include a great variety of profiles and finishes. The profile of the exterior surface 66 may include, but is not limited to, round, bubble, tapered, or oval, and the finish of the exterior surface 66 may include, but is not limited to, knurled, smooth, or rough. Also, the locking shape may be any viable shape able to accomplish the intended purpose, including but not limited to, square, rectangular, and triangular, or some complex combination thereof. The retaining flanges 74, 102 of the recess portions 52, 60 may be different in size and/or shape as the annulus portions of the second end 36 of the upper shaft section 24 and the first end 38 of the lower shaft section 30, respectively, or the recess portions 52, 60 may be non-existent altogether. Similarly, the outer surfaces 78, 106 of the plug portions 76, 104 need not be smooth or be adapted to engage the second end 36 of the upper shaft section 24 and the first end 38 of the lower shaft section 30, respectively, in a press-fit manner. The outer surfaces 78, 106 of the plug portions 76, 104 may, for example, be knurled, include ribs, or other non-smooth elements to provide a better connection between the male and female connector portions 26, 32 and the upper and lower shaft sections 24, 30, respectively. The outer surfaces 78, 106 of the plug portions 76, 104 may also include external threads that may engage with internal threads disposed in the upper and/or lower shaft section 24, 30, respectively. Alternatively, the upper and/or lower portions 22, 28 may be integrally formed with the male and/or female connection members 26, 32, such that the male and/or female connection members 26, 32 need not be separately attached to the upper and/or lower shaft sections 24, 30.

Figure 4:
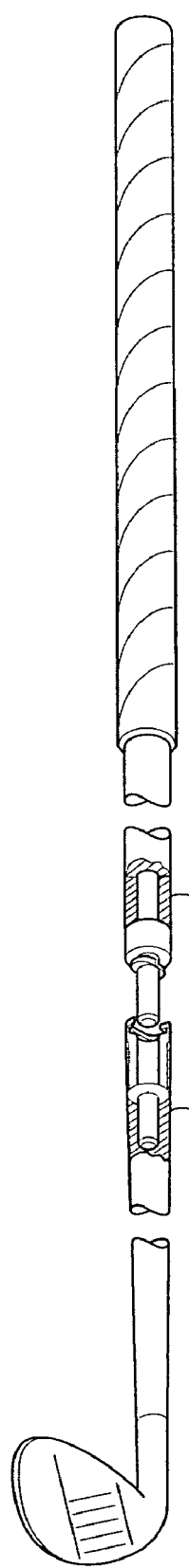
FIG. 4 is an isometric view of the separable golf club of FIG. 1, with the connector portions illustrated in partial cross-sectional view in a disconnected position.
Figure 5:
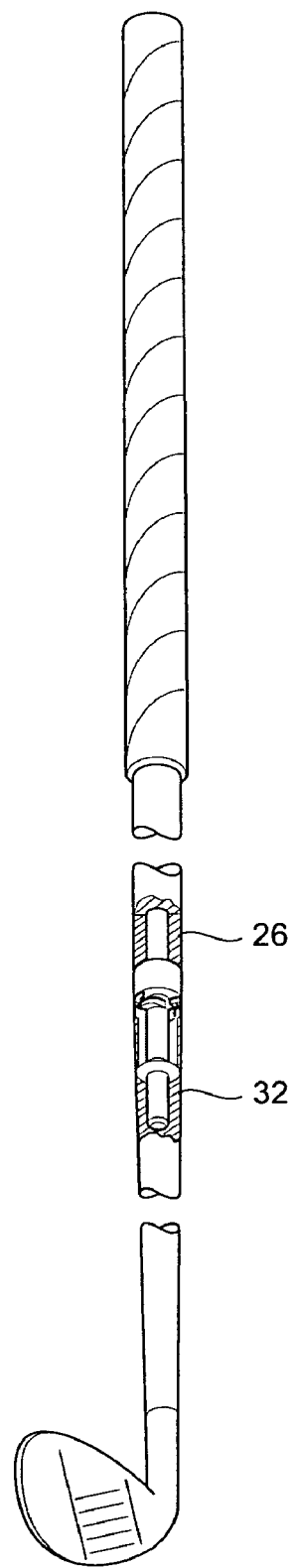
FIG. 5 is an isometric view of the separable golf club in FIG. 1, with the connector portions illustrated in partial cross-sectional view in a semi-connected position.
Figure 6:
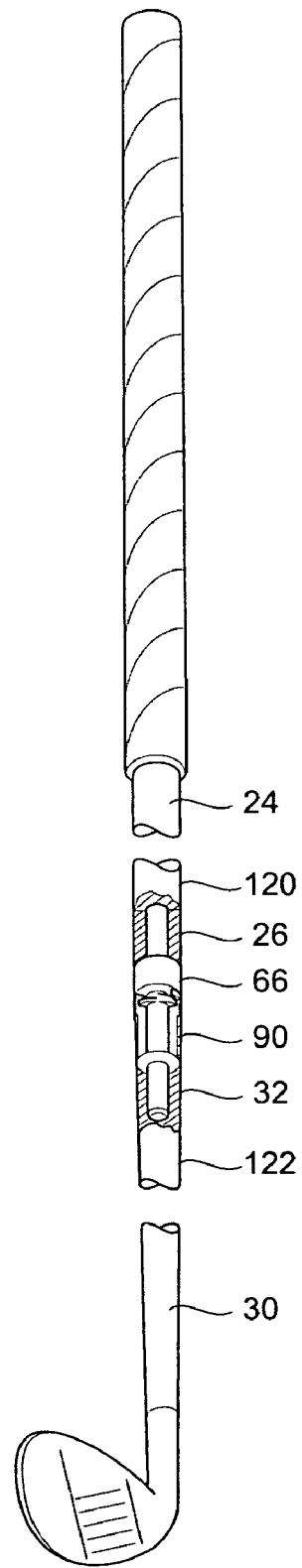
FIG. 6 is an isometric view of the separable golf club in FIG. 1, with the connector portions illustrated in partial cross-sectional view in a connected position.

As seen in FIGS. 4–6, the separable golf club 20 is intended to operate using a simple insert and twist method to connect the first connector portion 26 to the second connector portion 32, and hence the upper portion 22 of the golf club 20 to the lower portion 28 of the golf club 20. More specifically, to connect the first connector portion 26, which is illustrated as the male portion 26, and the second connector portion 32, which is illustrated as the female connector portion 32 together, the user inserts the male portion 26 into the female portion 32, as seen in FIG. 4, until the male and female portions 26, 32 are substantially abutting each other (FIG. 5). At this point, the user rotates the male and female portions 26, 32 relative to each other to force the male and female portions 26, 32 into a fixed engagement with one another, as depicted in FIG. 6.

In operation, the user or, more particularly, the manufacturer may first secure the male and female connector portions 26, 32 into the second end 36 of the upper shaft section 24 and the first end 38 of the lower shaft section 30, respectively. It is, however, contemplated that the male and female connector portions 26, 32 may be used in reverse orientation, such that, for example, the male connector portion 26 is used in with lower shaft section 30 and the female connector portion 32 is used in with upper shaft section 24. In this exemplary embodiment, the manufacturer may press the plug portions 76, 104 of the male and female connector portions 26, 32 into the second end 36 of the upper shaft section 24 and the first end 38 of the lower shaft section 30, respectively, such that the outer surfaces 78, 106 of the plug portions 76, 104 abut inner surfaces 112, 114 of apertures 111, 110 disposed in the upper shaft section 24 and the lower shaft section 30. Adhesive may further be added between the male connector portion 26 and the upper shaft portion 24, and female connector portion 32 and the lower shaft portion 30, to aid in the securing of the components to each other.

The upper portion and lower portion 22, 28 of the golf club 20 may then be intermittently connected, and hence assembled, by connecting the male and female connector portions 26, 32 together. More specifically, the user may insert the guide rod 54 located on the male connector portion 26 of the golf club 20 through the aperture 94 and the cavity 96 into the bore 64 of the female connector portion 32. This action may be accomplished by placing the bore 64 and the guide rod 54 in general vicinity of each other without necessarily perfectly aligning the male and female connector portion 26, 32, as seen in FIG. 4. In fact, by orienting and bringing the bore 64 and guide rod 54 together, the male and female connector portions 26, 32 of the golf club 20 will axially align without further aid and or alignment from the user. Therefore, the user may quickly and easily axially align the bore 64 and the guide rod 54, and ultimately the male and female connector portions 26, 32 of the golf club 20, without necessarily having visual contact with the male and female connector portions 26, 32.

Before placing the first locking member 56 into the second locking member 62, (i.e., the lugs 82 into the cavity 62) the user may align the shape of the first locking member 56 of the male connector portion 26 and the aperture 94 of the female connector portion 32. More specifically, the user may rotate the guide rod 54 in the bore 64 until the shape of the first locking member 56 of the male connector portion 26 aligns with the aperture 94 of the female connector portion 32, thereby allowing the first locking member 56 to penetrate the second mating surface 92 of the female connector portion 32 and ultimately allowing the first and second locking members 56, 62 to engage.

Once the first and second locking members 56, 62 are aligned, the user may further insert the male connector portion 26 into the female connector portion 32 until at least a portion of the first locking member 56 is located within the cavity 96, and until at least a portion of the surfaces 84 or 86 of the lugs 82 is engageable with one of the lugs surfaces 89 and 100. In the embodiment depicted in FIGS. 4-6, the lower surface 86 of the lugs 82 is engageable with the lug surface 98 if, upon rotation of the upper and lower portions 24, 28 of the golf club 20, and hence the male and female connector portions 26, 32 relative to each other, the lower surface 86 of the lugs 82 is able to abut the lug surface 98.

When one of the surfaces 84 or 86 of the lugs 82 is engageable with the surface 98 or 100, the user may rotate the male and/or the female connector portions 26, 32 relative to each other. More specifically, by rotating the male and/or the female connector portions 26, 32 relative to each other, the user forces the male and female connector portions 26, 32 together, and more particularly, forces the first mating surface 68 of the male connector portion 26 toward the second mating surface 92 of the female connector portion 32. The user rotates the male and/or the female connector portions 26, 32 relative to each other until a tight fit is achieved, i.e., when the distance between bottom and top surfaces 86 and 84 of the lug 82 is equal to or slightly less than the distance between the surfaces 98 and 100 of the cavity 96, at which the point the two connector portions 26, 32, and hence the upper and lower portions 22, 28 of the golf club 20, are tightly fit together.

Another feature of the golf club 20, as depicted in FIG. 1, is that the user may transfer a lateral force or load from upper portion 22 of the golf club 20 to the lower portion 28 of the golf club 20, when the first and second connector portions 26, 32 are engaged. In particular, when the golf club 20 is in the assembled position, as shown in FIG. 6, a lateral and/or transverse force may be applied to the upper portion 22 of the golf club 20 and hence the first connector portion 26 of the golf club 20, and translated to the second connector portion 32 and hence the lower portion 28 of the golf club 20 without failure of the connection. Similarly, the second connector portion 32 may transfer a lateral force or load to the first connector portion 26 without failure of the connection.

More particularly, when a force is applied to the golf club 20, the force may be concentrated near the connection of the upper and lower portions 22, 28 of the golf club 20. The first and second connector portions 26, 32 may, therefore, bend and/or break depending on the magnitude of the force. Several factors including, but not limited to, the increased contact area between the first mating surface 68 of the male connector portion 26 and the second mating surface 92 of the female connector portion 32, the length and depth of the guide rod 54 and the bore 64, and the gap between the outer surface 70 of the guide rod 54 and an inner surface 93 of the bore 64, may increase the strength of the connection between the upper and lower portions 22, 28 of the golf club 20, and hence improve the ability of the golf club 20 to translate force.

In another exemplary embodiment, as seen in FIGS. 3 and 7, the upper shaft section 24 and the lower shaft section 28, and more specifically, the first and second connector portions 26, 32 may be oriented relative to each other to optimize the structure of the first and second connector portions 26, 32 for use with the golf club 20. In particular, as seen in FIG. 7, as the golf club 20 is swung, the dynamics of the swing will, in conclusory terms, cause a force A on the head 44 and hence the golf club 20, such that the upper and lower shaft sections 24, 30 will bend with the head 44 in response to the force A. The lugs 82 of the first connector portions 26 may, therefore, be oriented relative to the second connector portion 32 and/or the swing path "SP" of the golf club 20 to optimize the structure of the connector portions 26, 32. As such, the lugs 82 of the first connector portion 26 may be oriented at ninety degrees relative to the aperture 94, and/or the lugs 82 of the first connector portion 26 may be oriented tangentially to a swing path "SP".

Another feature of the golf club 20, as depicted in FIG. 1, is that the first and second connector portions 26, 32 may, in combination with the upper and lower shaft sections 24, 30, provide an appearance of the golf club 20 having a contiguous shaft. More specifically, as seen in FIG. 3, an outer surface 120 of the upper shaft section 24 may be continued in shape and size by the exterior surface 66 of the first connector portion 26, the exterior surface 90 of the second connector portion 32, and an outer surface 122 of the lower section 30 of the shaft. As such, the first and second connector portions 26, 32 may be camouflaged in the shaft of the golf club 20, thereby providing the appearance of a seamless, unitary shaft.

In another exemplary embodiment, as depicted in FIG. 8, the first connector portion 26 may include one or more support sleeves 124, and/or the second connector portion 32 may include one or more support sleeves (not shown). More specifically, the first or second connector portions 26, 32 may include a support sleeve 124 extending past the bases 50, 58, and the support sleeve 124 may be adapted to engage with a component of the other portion. For example, as illustrated in FIG. 8, the male connector portion 26 may include a support sleeve 124 disposed on the outer edge of the first base 50 and extending therefrom, wherein the support sleeve 124 may be adapted to engage with the exterior surface 90 of the female connector portion 32, which may include a notch 126 adapted to receive the support sleeve 124.

The first and/or second connector portion 26, 32 may also include a support sleeve 130, 132 disposed opposite the guide rod 54 and cavity 96, respectively. More specifically, as seen in FIG. 8, the support sleeves 130, 132 may extend axially from the bases 50, 58 such that annular shaped cavities are created between the outer surfaces 78, 106 of the plugs 76, 104 and inner surfaces 134, 136 of the sleeves 130, 132, wherein the retaining ridges 74, 102 are now the bottoms of the annular shaped cavities. As such, the annular shaped cavities of the first and second connector portions 26, 32 may be adapted to receive the upper and lower sections 24, 30 of the shaft, respectively. Thus, with the addition of the support sleeves 130, 132, the second end 36 of the upper section 24 may be received by the first connector portion 26, such that the second end 36 of the upper section 24 of the shaft abuts the retaining flange 74, and the inner surface 134 of the support sleeve 130 and the outer surface 78 of the plug portion 76 substantially abut the outer surface 120 and an inner surface 121 of the upper section 24 of the shaft. Similarly, the first end 38 of the lower section 30 may be received by the second connector portion 32, such that the first end 38 of the lower section 30 of the shaft abuts the retaining flange 102, and so that the inner surface 136 of the support sleeve 132 and the outer surface 106 of the plug portion 104 substantially abut the outer surface 122 and an inner surface 123 of the lower section 36 of the shaft.

Figure 8A:
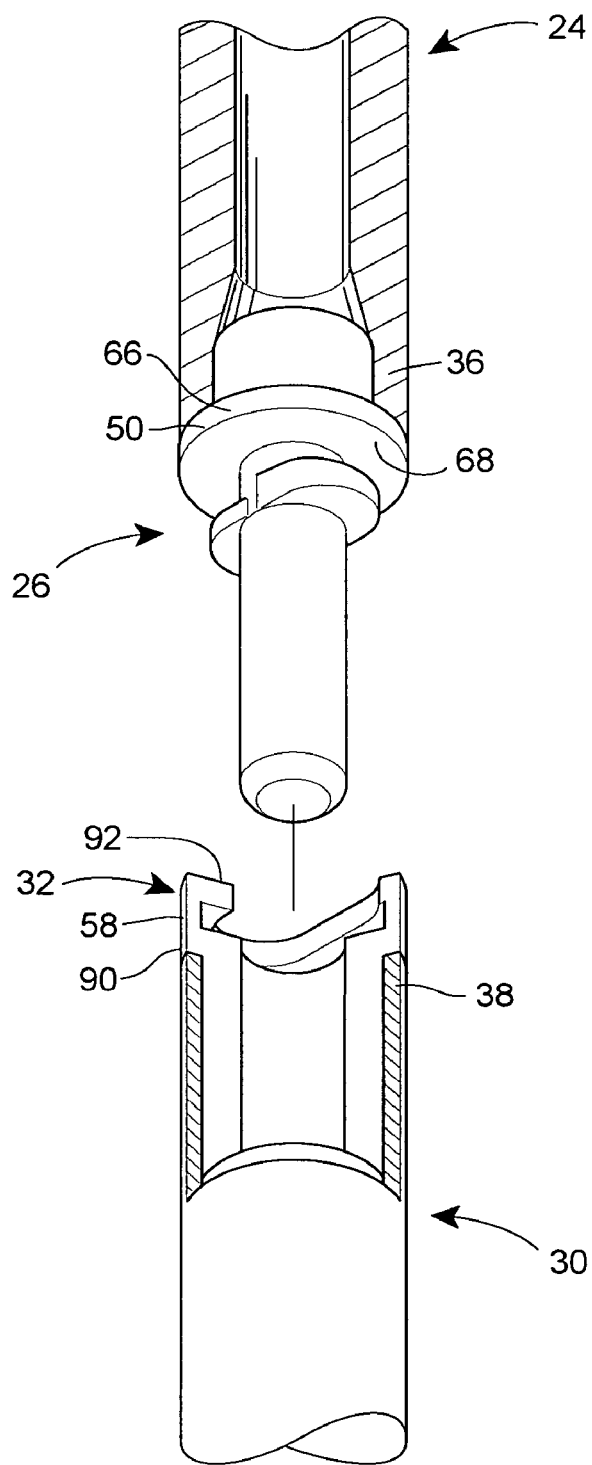
FIG. 8a is an isometric view of another embodiment of the connector portions of the separable golf club with the connector portions illustrated in partial cross-sectional view in a connected position.

In another exemplary embodiment, as depicted in FIG. 8a, the male connector portion 26 and/or the female connector portion 32 may be disposed in the upper shaft section 24 and/or the lower shaft section 30 of the golf club 20, such that only a minority of the male and/or the female connector portions 26, 32 are visible when the golf club 20 is in the connected position. More specifically, the first base 50 may be shortened in length, such that an area of the exterior surface 66 of the first base 50 is diminutive relative to the upper shaft section 24, and/or the second base 58 may be shortened in length, such that an area of the exterior surface 90 of the second base 58 is diminutive relative to the lower shaft section 30.

Figure 8B:
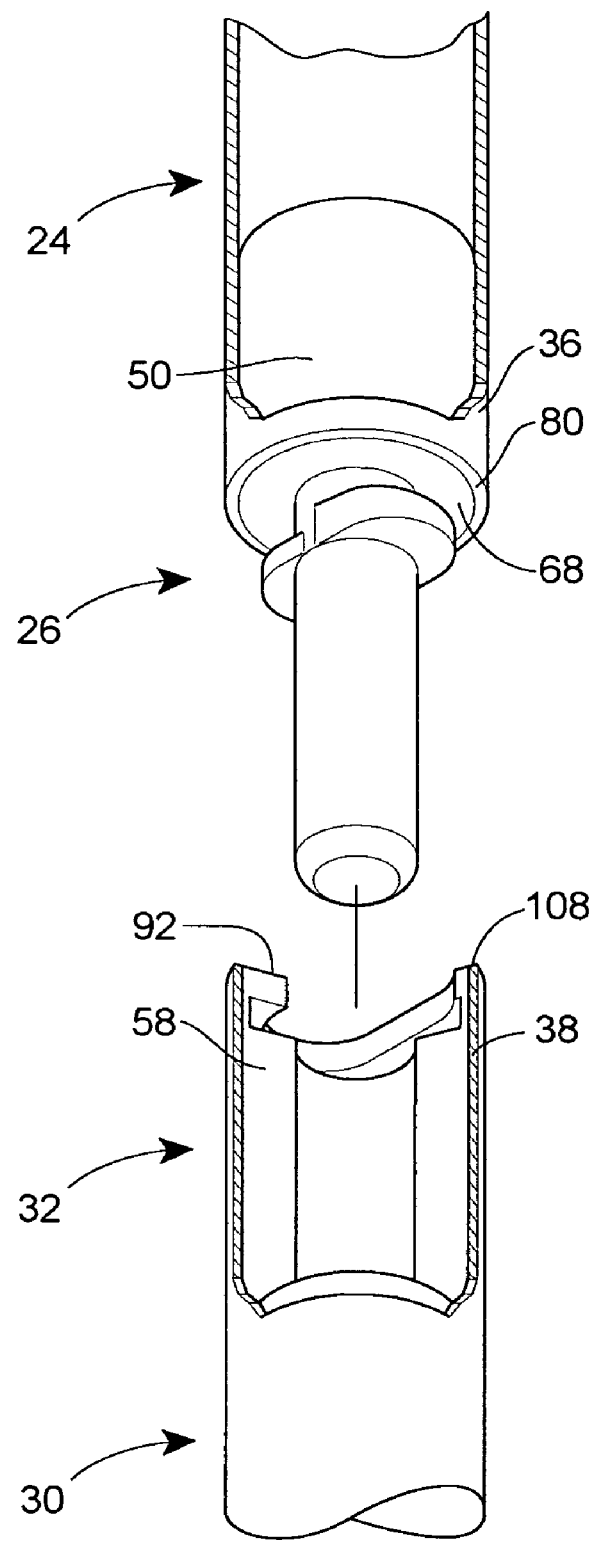
FIG. 8b is an isometric view of another embodiment of the connector portions of the separable golf club with the connector portions illustrated in partial cross-sectional view in a connected position.

In yet another exemplary embodiment, as depicted in FIG. 8b, the male connector portion 26 and/or the female connector portion 32 may be disposed in the upper shaft section 24 and/or the lower shaft section 30 of the golf club 20, such that male and/or the female connector portions 26, 32 are not visible at all when the golf club 20 is in the connected position. More specifically, the first mating surface 68 of the male connector portion 26 may be in the same general plane as the annulus portion 80 at the second end 36 of the upper shaft section 24, and the first base 50 may be fully recessed in the upper shaft section 24. Similarly, the second mating surface 92 of the female connector portion 32 may be in the same general plane as the annulus portion 108 at the first end 38 of the lower shaft section 30, and the second base 58 may be fully recessed in the lower shaft section 30. As such, the first mating surface 68 of the male connector portion 26 may abut the second mating surface 92 of the female connector portion 32 when the golf club 20 is in the connected position, and/or the annulus portion 80 at the second end 36 of the upper shaft section 24 may abut the annulus portion 108 at the first end 38 of the lower shaft section 30 when the golf club 20 is in the connected position.

The golf club 20, including the grip 42, the upper and lower shaft sections 24, 30, the club head 44, and the male and female connector portions 26, 32 may be manufactured from a variety of materials and in a variety of ways. For example, the grip 42 may be manufactured from leather, rubber, or any other material able to provide a better grip on the golf club 20, and the upper and lower shaft sections 24, 30 may be manufactured from materials, including but not limited to, metals, plastics, fiberglass, graphite and composites. Similarly, the club head 44 may vary in type, size and materials. For example, the club head 44 may be an iron, a wood, a wedge, a utility/hybrid head or a putter, and may be manufactured from materials, including but not limited to, metals and wood. The male and female connector portions 26, 32 may be manufactured from materials, including but not limited to, metals, plastics, composites, wood and fiberglass. Similarly, the method of manufacture may vary depending on the materials used. For example, when manufacturing the first and second connector portions 26, 32 from metal, a stock piece off raw material such as a rod or pipe may be cut into two portions, from which the first and second connector portions 26, 32 can then be cut and shaped. When manufacturing the first and second connector portions 26, 32 from plastic, however, the male and female connector portions 26, 32 may be molded using, for example, a blow molding or pour molding process.

Figure 9:
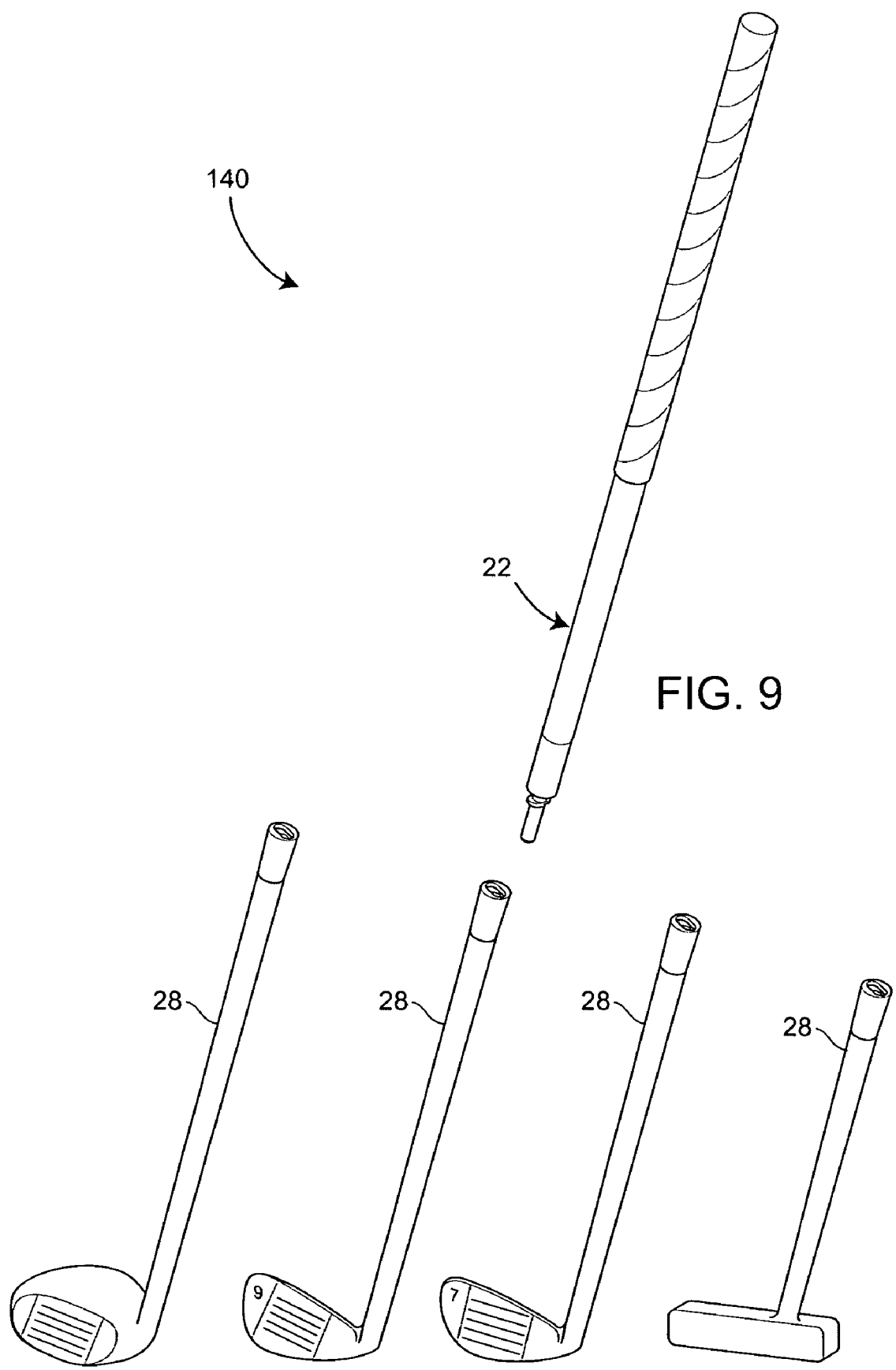
FIG. 9 is an isometric view of one embodiment of a set of golf clubs according to the present disclosure.

As illustrated in FIG. 9, in another exemplary embodiment, a set of golf clubs 140 may be manufactured using the connection technique described above. The set of golf clubs 140 may include one of more upper portions 22 and one or more lower portions 28, and more specifically, may include one upper portion 22 and a plurality of lower portions 28 where each lower portion 28 has a different club head 44 which varies the degrees of loft and/or the type of club. The matching set of golf clubs 140 may include woods, irons, hybrid clubs, and a putter. For the sake of brevity, however, the disclosure will herein be limited to irons.

The upper portion 22 of the golf club 20 may be approximately half the length of the entire shaft of the longest club, but the length of the upper portion 22 may also be governed to place the upper and lower connector portions 26, 32 at a point along the shaft best suited for weighting the clubs. The lower portions 28 of the set of golf clubs 140 may have lengths, that when combined with the upper portion 22 of the shaft, effectuate a full length golf club of a length proper for that loft or type of club. More specifically, as is known in the art, irons vary both in loft and length. That is, the less loft a club has, the longer the club generally will be. For example, a nine iron has more loft than an eight iron and is, therefore, shorter.

As such, the length of the lower portion 28 may vary according to the loft and type of the club head 44, such that the lower portion 28 of the eight iron is longer than the lower portion 28 of the nine iron, the lower portion 28 of the seven iron is longer than the lower portion 28 of the eight iron, etc. Additionally and/or alternatively, the length of the upper portion 22 of the shaft, the lower portion 28 of the shaft, and hence the golf club 20 itself, may vary for any number of reasons, including, but not limited to, accommodating a height of the user, locating a weight, and/or improving performance of the golf club 20.

In another exemplary embodiment, the golf club 20 may also be weighted at various portions of the golf club 20 to provide the user with a golf club 20 (FIG. 1) or with a set of golf clubs 140 (FIG. 9) having a proper or desired weight or feel and/or with a set of golf clubs 20 that are matched. The set of golf clubs 140 may be used herein as meaning a plurality of golf cubs and/or an entire set of traditional golf clubs. As described in great detail in a book entitled *The Physics of Golf*, $2^{nd}$ Ed., by Theodore P. Jorgenson, a golf club 20 and/or a set of golf clubs 140 may be properly weighted and/or matched to suit the user and/or the user's playing style. More specifically, a properly weighted golf club 20 may be a golf club 20 that the user is most comfortable using, and/or may be the golf club that produces the best results for the user. Similarly, a matched set of golf clubs 140 may be a set of golf clubs 140 in which the various golf clubs feel the same to the user while swinging and/or holding the clubs. For example, the user may have a golf club that feels the best, or with which the user gets the best results (i.e. the eight iron); and the remainder of the irons (i.e. the 3, 4, 5, 6, 7, 9, and PW) may be altered to feel like the eight iron.

The term "feel" will be used herein to describe several different ways the user may feel the golf club 20. For example, the user may feel the club 20 as the user is holding the club 20 in a vertical orientation, such that the user may simply feel the weight of the club 20. Additionally, the user may feel the club 20 as the user is holding the club 20 in a horizontal orientation, such that the user may feel the weight of the club 20 at an axis of rotation, and the user may feel the club 20 dynamically, as the user is moving the club 20 during an ordinary golf swing.

The golf club 20 may be properly weighted and may be matched to other clubs by adjusting the weight of the club 20 at various locations along the golf club 20. More specifically, the weight of the golf club 20 may be varied at one or more of the head of the club 20, along the shaft 24, 30 of the club 20, and at the axis of rotation or near the grip 42 of the golf club 20. The weight of the golf club 20 need not, however, be varied at all locations to accomplish a properly weighted golf club 20 or set of golf clubs 140, but may be varied at any of one or more locations. In the exemplary embodiment described herein, the user (or manufacturer) may only vary the weight of the golf club 20 at two locations, described herein, may vary the weight of the golf club 20 at the club head 44, and along the shaft 24, 30 of the golf club 20. However, it will be understood that the user or manufacturer may vary the weight at other or additional locations as well.

Figure 10:
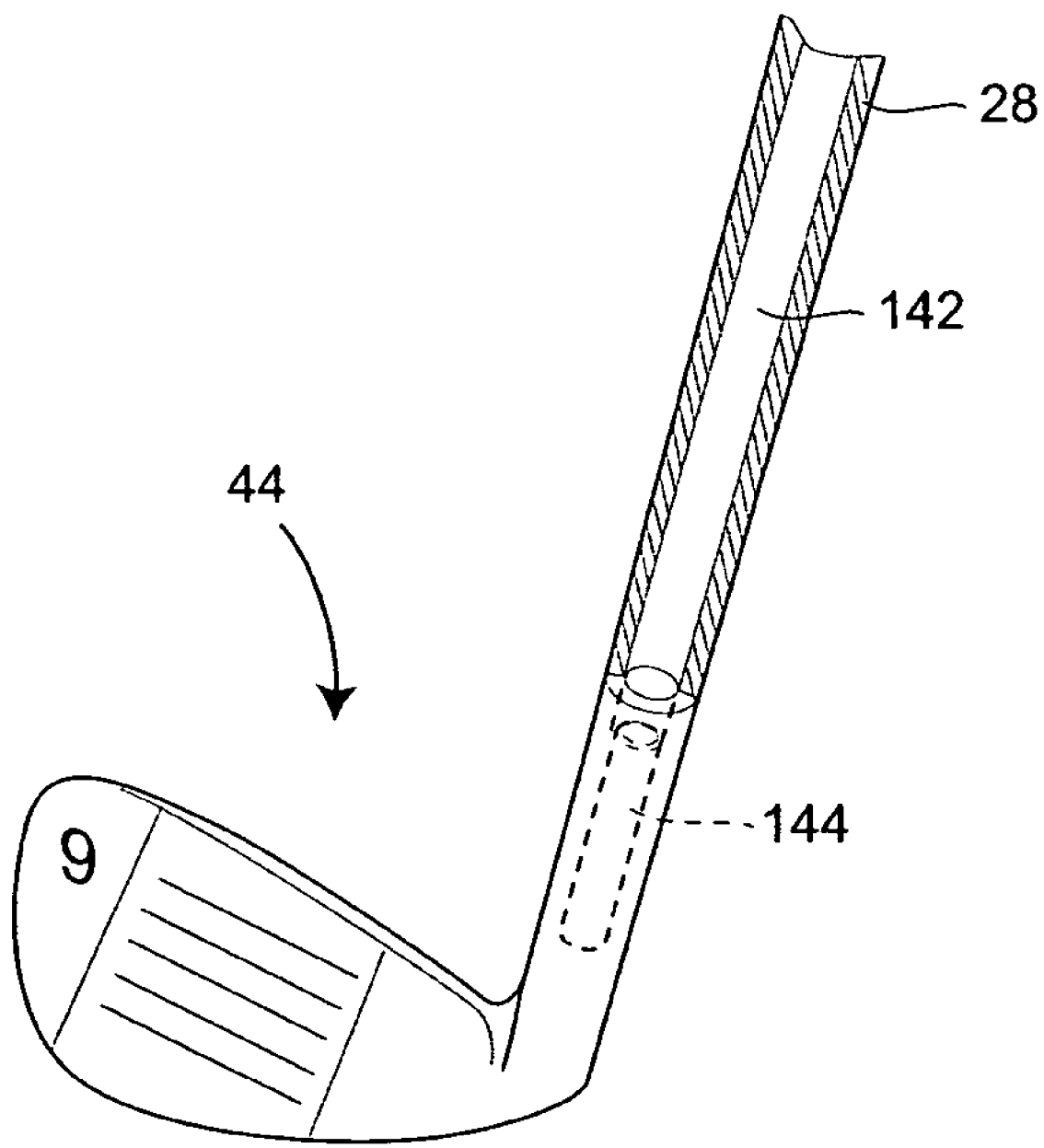
FIG. 10 is an isometric view of one embodiment of a club head according to the present disclosure.

The weight to the club head 44 may be varied in several ways. For example the user may have a variety of club heads 44 of equal loft (i.e., may have a variety of 8 irons) that have different weights. Similarly, the user may have a club head 44 from which material and hence weight may be removed until a properly weighted club head 44 is achieved. The club head 44 may also include an insert of variable weight. For example, the club head 44, as seen in FIG. 10, may include a cavity 142 in which is disposed an insert whose weight may be varied. The weight of the insert 144 may be manipulated in many ways, including but not limited to, adding or subtracting material, changing the material type, and possibly eliminating the insert 144 altogether.

Figure 11:
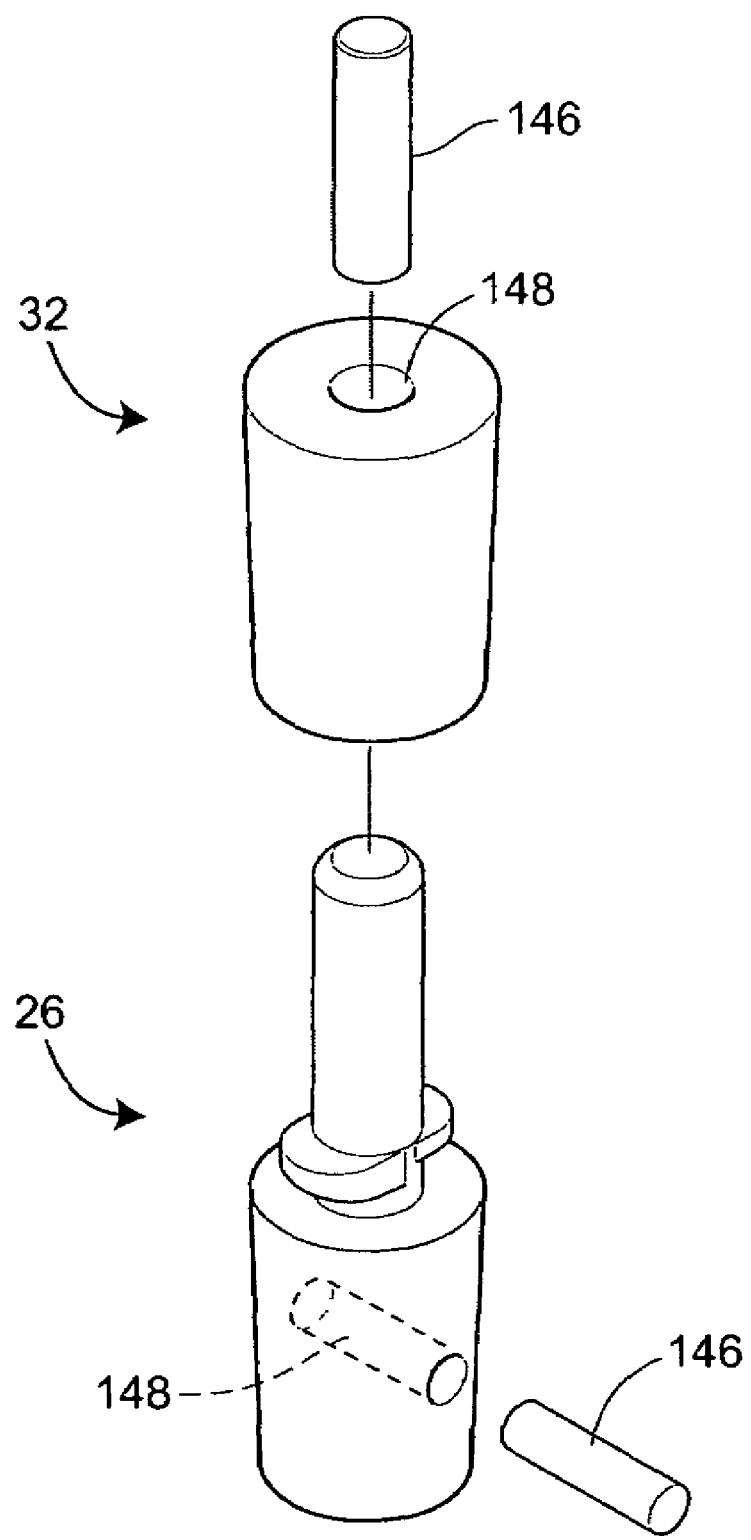
FIG. 11 is an isometric view of another embodiment of the connector portions of the separable golf club in FIG. 1 in the disconnected position.

The weight along the shaft 24, 30 may similarly be varied in several ways. For example, with the addition of the first and second connector portions 26, 32 along the shaft of the golf club 20, the user may have a variety of first and/or second connector portions 26, 32 that have different weights. Similarly, the user may have first and/or second connector portions 26, 32 from which material and hence weight may be removed or added until the proper weight along the shaft is achieved. The first and/or second connector portions 26, 32 may also include an insert of variable weight, as seen in FIG. 11. For example, the first and/or second connector portions 26, 32 may include a cavity 148 in which an insert 146 whose weight may be varied may be disposed. The weight of the insert 146 may be manipulated in many ways, including but not limited to, adding/subtracting material, changing the material type, and possibly eliminating the insert altogether. Of course different fabricated inserts of the same size or shape but of different weights may be provided to allow a user to select the appropriate insert to be placed into the shaft.

Additionally and/or alternatively, the manufacturer and/or the user may vary one or more weights in the upper and lower shaft portions 24, 30 of the golf club 20 to achieve the desired golf club 20 and/or set of golf clubs 140. For example, the manufacturer and/or the user may remove the first and/or second connector portions 26, 32 from the shaft portions 24, 30, respectively, and insert a weight into or remove a weight from the shaft portions 24, 30. As such, the manufacturer and/or the user may have access to an interior of the upper and lower shaft portions 24, 30, during and/or after manufacturer of the golf club 20 and/or the set of golf clubs 140 due to the use of the connector members 26, 32.

A container 150 for holding, storing, and/or transporting the golf club 20 and/or the set of golf clubs 140, as seen in FIGS. 12-14 may include a body 152, a carrying portion 154, and a plurality of compartments 156. The body, as seen in FIG. 12, may include a plurality of sides 158 that make-up an outer casing or may only have a single side 158, such as seen in FIGS. 13 and 14. The carrying portion 154 may be any structure adaptable to carry, store and/or rest the container 150. For example, the carrying portion 154 may be a handle (FIG. 12), a hook (FIG. 13), and/or a strap (FIG. 14). The plurality of compartments 156 may be various types of compartments 156 adapted to hold at least one upper portion 22 and a plurality of lower portions 28. The compartments 156 may be cavities, as seen in FIG. 12, in which the upper portion 22 and the plurality of lower portions 28 can lay. The compartments 156 may, however, be slots or pockets, as illustrated in FIGS. 13 and 14 into which the upper portion 22 and the plurality of lower portions 28 may be slid or placed. The compartments 156 and the container 150 in general are smaller, and more specifically, are shorter than the compartments and the containers for non-collapsible golf clubs. In the exemplary embodiments of FIGS. 12–14, the compartments 156 may be approximately half the size of traditional non-collapsible golf club containers. More specifically, storage containers for standard sized golf clubs that fully enclose the golf clubs may have compartments that are sized to fit the full length of the standard sized golf clubs, and storage containers for standard sized golf clubs that leave exposed parts of the golf clubs, for easy access as an example, may have compartments that are shorter than the full length of the standard sized golf clubs to ensure that at least a portion of the golf clubs remains exposed. Similarly, as can be seen in FIG. 12, the storage container 150 fully encloses the upper and lower portions 22, 28 of the golf clubs 20 and, therefore, has compartments 156 that are sized to fit the lengths of the upper and lower portions 22, 28. As can be seen in FIGS. 13 and 14, the storage containers 150 that partially enclose the upper and lower portions 22, 28 of the golf clubs 20 may have compartments 156 that are sized to fit the lengths of the upper and lower portions 22, 28, while still leaving exposed parts of the upper and lower portions 22, 28.

As such, holding, storing, and/or transporting the golf club 20 and/or the set of golf clubs 140 is easier due to the reduced size the container 150. While shown with a single upper shaft portion 22 to be connected to each of the lower portions 28, the set of golf clubs 140 could include multiple upper shaft portions 22 and could, if desired, include a separate upper shaft portion 22 for each lower shaft portion 28 (which would make weighting of each of the clubs 20 more flexible as it allows placing weights in the upper shaft portion 22 as well for any particular golf club 20).

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A separable iron, wood, or wedge golf club comprising:
    an upper shaft portion having one of a first connector portion and a second connector portion disposed on a first end of the upper shaft portion; and
    a lower shaft portion having the other one of the first connector portion and the second connector portion disposed on a first end of the lower shaft portion;

wherein the first connector portion includes a first base having a first mating surface, a first locking member having one or more outwardly protruding lugs including a lug surface, and a substantially rigid guide rod; and wherein the second connector portion includes a second base having a second mating surface, a second locking member including an aperture and a cavity and a bore, wherein the bore is adapted to receive the guide rod, and the cavity is adapted to receive the first locking member and includes a cavity surface, and wherein the lug surface and the cavity surface are angled relative to each other, so that the first base and the second base are forced together during rotation of the first and second connector portions relative to each other when the first locking member is disposed in the cavity.

2. The separable golf club of claim 1, wherein an exterior surface on the first base is contiguous with an exterior surface of the upper shaft portion and an exterior surface on the second base is contiguous with an exterior surface of the lower shaft portion.

3. The separable golf club of claim 2, wherein the exterior surface on the first base is contiguous with the exterior surface on the second base.

4. The separable golf club of claim 1, wherein at least one of the one or more outwardly protruding lugs is oriented tangentially to a swingpath of the golf club during use.

5. The separable golf club of claim 1, wherein a second end of the lower shaft portion includes a club head.

6. The separable golf club of claim 5, wherein the club head includes a weighting member for varying the weight of the golf club at the club head.

7. The separable golf club of claim 1, wherein a second end of the upper shaft portion includes a grip.

8. The separable golf club of claim 1, wherein the one or more lugs is substantially planar.

9. A separable golf club comprising:
an upper shaft portion having one of a first connector portion and a second connector portion disposed on a first end of the upper shaft portion; and
a lower shaft portion having the other one of the first connector portion and the second connector portion disposed on a first end of the lower shaft portion;
wherein the first connector portion includes a first base having a first mating surface, a first locking member having one or more outwardly protruding lugs including a lug surface, and a guide rod;
wherein the second connector portion includes a second base having a second mating surface, a second locking member including an aperture and a cavity and a bore, wherein the bore is adapted to receive the guide rod, and the cavity is adapted to receive the first locking member and includes a cavity surface, and wherein the lug surface and the cavity surface are angled relative to each other, so that the first base and the second base are forced together during rotation of the first and second connector portions relative to each other when the first locking member is disposed in the cavity; and wherein one of the first and second connector portions includes an insert for varying the weight of the golf club at the one of the first and second connector portions.

10. A separable iron, wood, or wedge golf club comprising:
an upper shaft portion having a first end and a second end, wherein the first end of the upper shaft portion includes a grip and the second end of the upper shaft portion includes a first connector portion having a substantially rigid locking member; and
a lower shaft portion having a first end and a second end, wherein the first end of the lower shaft portion includes a second connector portion adapted to removably engage the substantially rigid locking member of the first connector portion; and
a weighting member insertable into one of the first connector portion, the second connector portion, the upper shaft portion, and the lower shaft portion, via an opening, the weighting member enables the weighting of the club to be altered.

11. The separable golf club of claim 10, wherein the weighting member includes one of the connector portions and an insert, the insert adapted to be disposed in a cavity in the one of the connector portions.

12. The separable golf club of claim 10, wherein the weighting member includes one of a plurality of inserts of different weights adapted to be disposed in a cavity mat least one of the upper and lower shaft portions.

13. The separable golf club of claim 10, wherein the second end of the lower shaft portion includes a club head.

14. The separable golf club of claim 10, wherein the first connector portion includes a first base having a first mating surface and a first locking member.

15. The separable golf club of claim 14, wherein the locking member includes one or more outwardly protruding lugs.

16. The separable golf club of claim 10, wherein the second connector portion includes a second base having a second mating surface, and a second locking member.

17. The separable golf club of claim 16, wherein the second locking member includes an aperture, a cavity, and a bore.

* * * * *

UNITED STATES PATENT AND TRADEMARK OFFICE
CERTIFICATE OF CORRECTION

PATENT NO. : 7,232,376 B2  
APPLICATION NO. : 10/844127  
DATED : June 19, 2007  
INVENTOR(S) : J. P. Droppleman Page 1 of 1

It is certified that error appears in the above-identified patent and that said Letters Patent is hereby corrected as shown below:

In the Claims:

At Column 14, line 34, "mat" should be -- in at --.

Signed and Sealed this

Twenty-fifth Day of December, 2007

JON W. DUDAS  
*Director of the United States Patent and Trademark Office*